July 21, 1936.  N. O. ALLYN  2,047,933
INTERNAL COMBUSTION ENGINE
Filed Oct. 27, 1934  4 Sheets-Sheet 1

INVENTOR.
N. O. ALLYN.
BY
ATTORNEY.

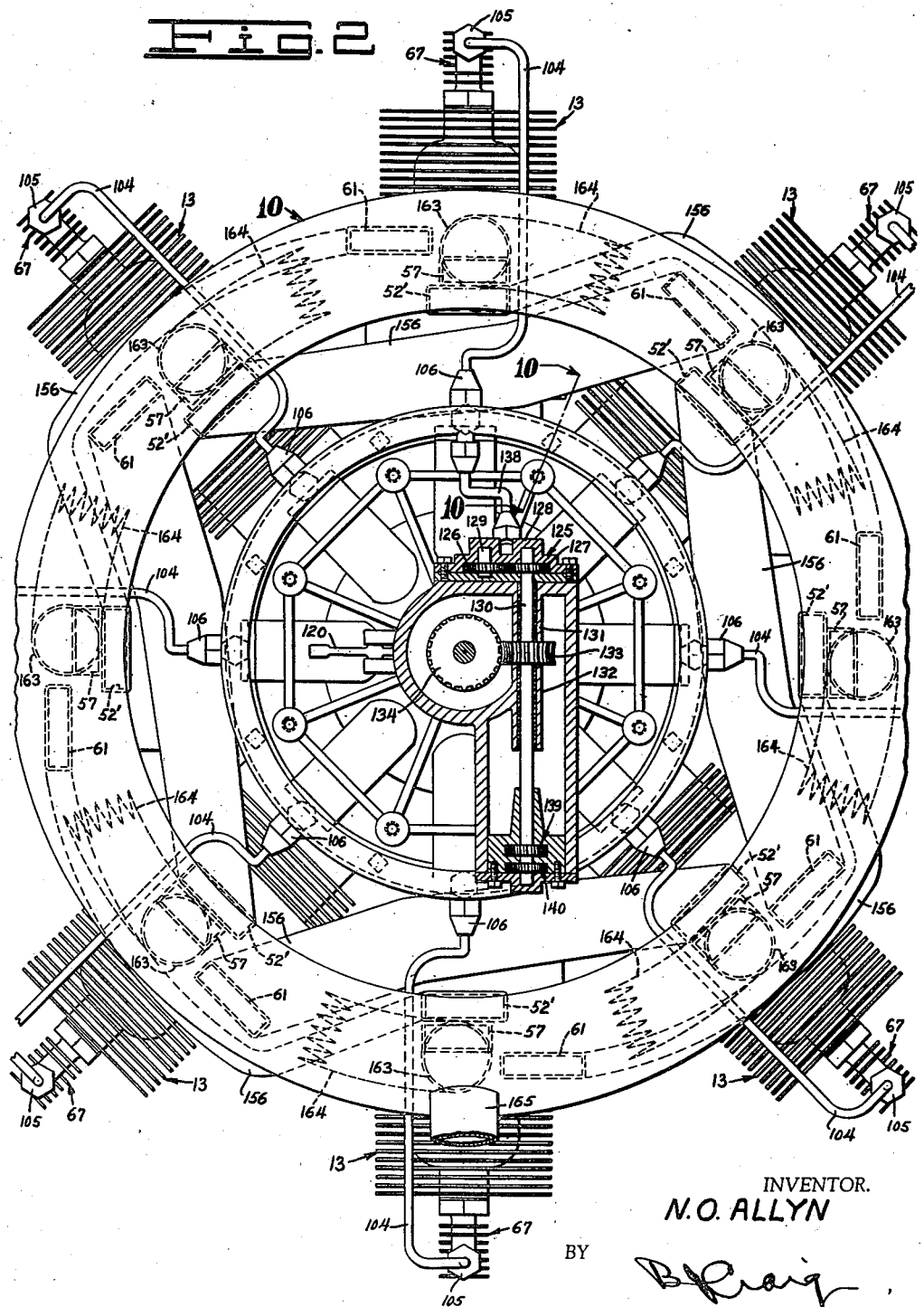

July 21, 1936.    N. O. ALLYN    2,047,933
INTERNAL COMBUSTION ENGINE
Filed Oct. 27, 1934    4 Sheets-Sheet 3
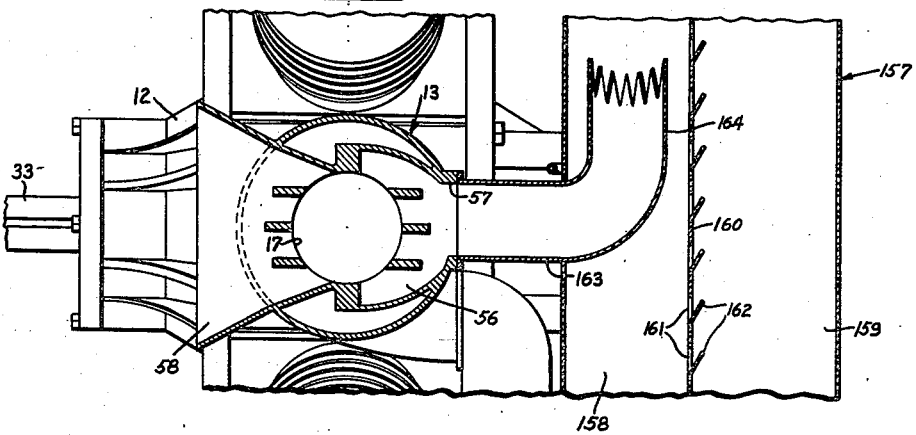
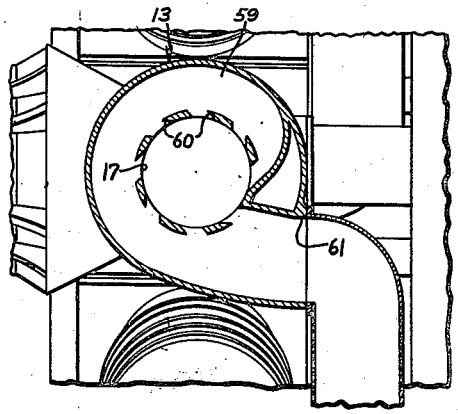
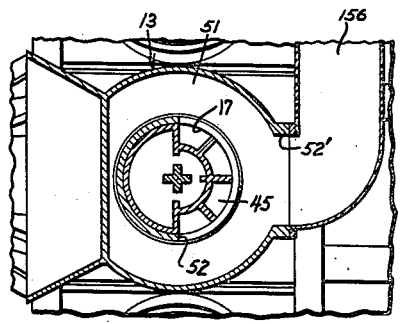
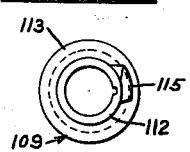
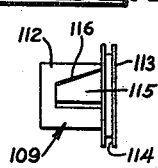
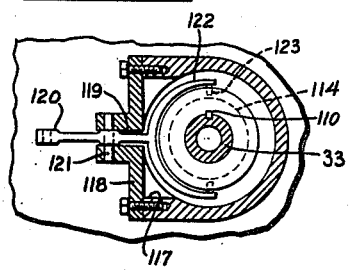
INVENTOR.
*N. O. ALLYN.*
BY
ATTORNEY.

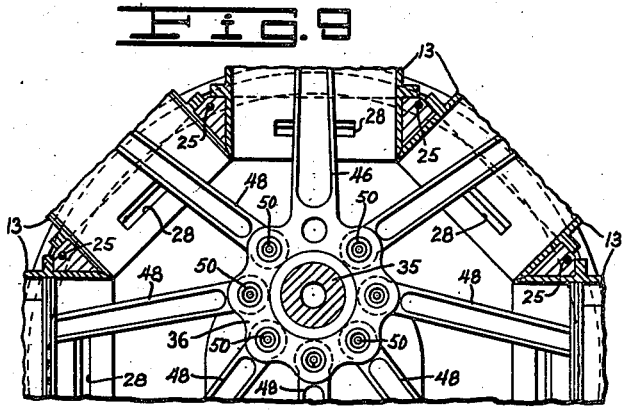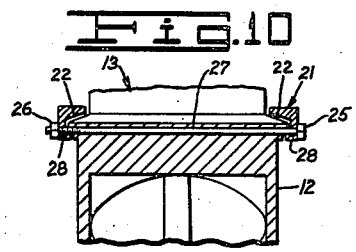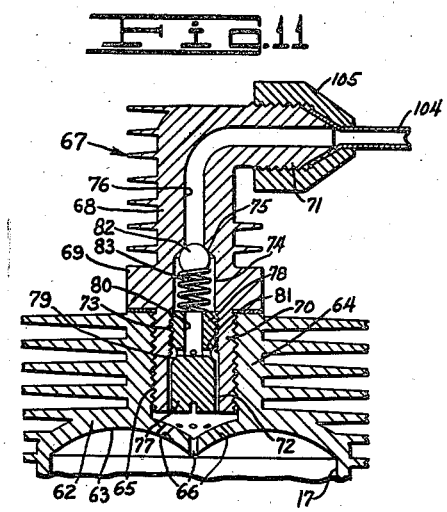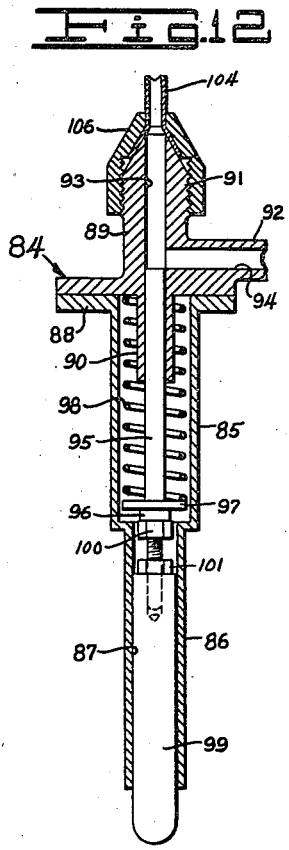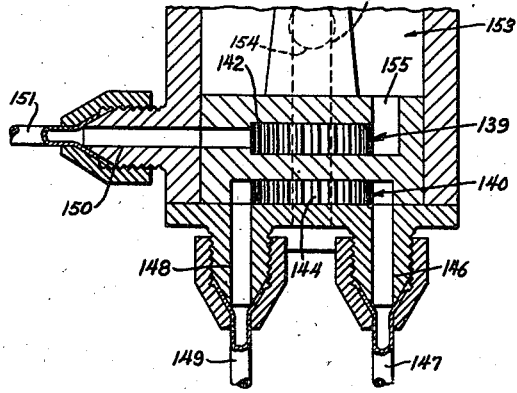
INVENTOR.
N. O. ALLYN.
ATTORNEY.

Patented July 21, 1936

2,047,933

UNITED STATES PATENT OFFICE 2,047,933

INTERNAL COMBUSTION ENGINE

Newell O. Allyn, South Gate, Calif.

Application October 27, 1934, Serial No. 750,320

10 Claims. (Cl. 123—55)

This invention relates to improvements in radial engines.

A specific object of the invention is to provide a novel cylinder and piston construction for a radial engine.

A further object of the invention is to provide a novel air intake construction for a radial engine.

Still another object of the invention is to provide an improved radial engine including a crank case and a plurality of independent cylinders with novel means for securing the cylinders to the crank case.

A still further object of the invention is to provide a novel exhaust manifold for an engine.

Other objects and the advantages of this invention will be apparent from the following description taken in connection with the accompanying drawings wherein:

Fig. 2 is a section taken on line 2—2 of Fig. 1;

Fig. 3 is a fragmentary section taken on line 3—3 of Fig. 1;

Fig. 4 is a fragmentary section taken on line 4—4 of Fig. 1;

Fig. 5 is a fragmentary section taken on line 5—5 of Fig. 1;

Fig. 6 is a fragmentary section taken on line 6—6 of Fig. 1;

Fig. 7 is an end view of the injector cam;

Fig. 8 is a side elevation of the injector cam;

Fig. 9 is a fragmentary section taken on line 9—9 of Fig. 1;

Fig. 10 is a fragmentary section taken on line 10—10 of Fig. 2;

Fig. 11 is an enlarged central section through one of the injector nozzles;

Fig. 12 is an enlarged central section through one of the injector pumps; and,

Fig. 13 is an enlarged fragmentary section taken on line 13—13 of Fig. 1.

Figure 1:
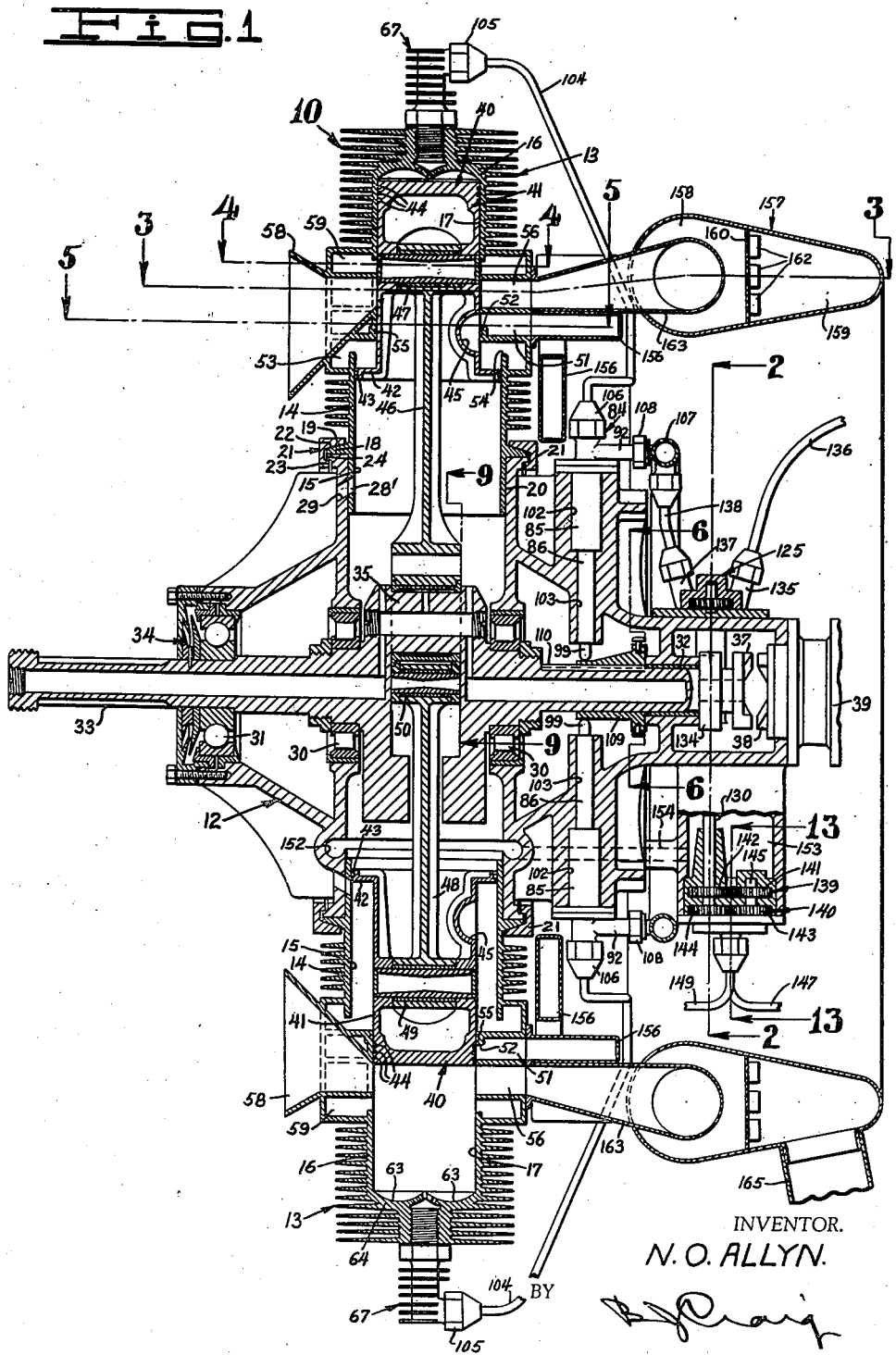
Fig. 1 is a central vertical section through my improved engine.

Referring to the drawings by reference characters I have indicated my improved engine generally at 10. As shown the engine 10 is of the radial type and includes a crank case 12 having cylinders 13, shown as eight in numbers, mounted thereon. Each of the cylinders 13 comprises an inner section 14 having a bore 15 therein and an outer section 16 having a bore 17 therein which is of less diameter than the bore 15. Intermediate the length of the sections 14 the cylinder includes a flange 18, the outer surface of which is bevelled as indicated at 19. The portion of each cylinder between the inner end thereof and the flange 18 is positioned in a bore 20 provided in the crank case 12 and the under surface of the flange 18 is adapted to engage a portion of the crank case.

For securing the cylinders 13 to the crank case I provide a pair of opposed retainer rings 21. The retainer rings 21 each include an annular bevelled face 22 and an annular flange portion 23. The bevelled faces 22 of the retainer rings engage the bevelled faces 19 of the cylinder flanges 18 and the flange portion 23 of the rings engage an annular flange portion 24 provided on the crank case 12. The retainer rings 21 are secured in position by a plurality of bolts 25 and nuts 26 (see Fig. 10). The bolts 25 are positioned in apertures 27 in the crank case and in apertures 28 in the retainer rings. When the nuts 26 are tightened on the bolts the retainer rings force the cylinder flange 18 into tight engagement with the crank case.

Between the flange 18 and the inner end each cylinder 13 has an aperture 28' in the side wall thereof and adjacent each cylinder the crank case has an aperture 29 therein which registers with the cylinder apertures 28'.

Mounted in the crank case 12, I provide a pair of spaced roller bearings 30. Spaced at one side or forward of the bearings 30 a ball bearing member 31 is mounted in the crank case and spaced at the opposite side or rearward of the bearings 30 a bushed bearing 32 is provided in the crank case.

Mounted in the bearings 30, 31 and 32, I provide a drive shaft 33 which at the forward end of the crank case extends out therefrom through a mechanical packing member 34. Between the bearings 30 the shaft 33 includes a crank portion 35 on which a spider member 36 is rotatably mounted. Mounted on and secured to the shaft 33 adjacent the rear of the bearing 32, I provide a starter clutch member 37 which is adapted to be engaged by a clutch portion 38 of a starter mechanism 39.

Positioned in each of the cylinders 13, I provide a piston 40 each of which includes an elongated body portion 41 having an enlarged outwardly directed flange 42 at its inner end. The body portion 41 of the piston has a sliding fit in the reduced bore 17 of the cylinder and the flange portion 42 of the piston has a sliding fit in the bore 15 of the cylinder. In the outer periphery of the piston flange 42, I provide a piston ring 43 and adjacent the outer end of the piston I provide a plurality of piston rings 44 in the body 41 of the piston. Adjacent the flange 42 the piston has a recess or pocket 45 in one side of the body which extends approximately half way around the piston (see Fig. 5). The spider 36 has a master connecting rod 46 integral therewith which is pivotally secured to one of the pistons 40 in the usual manner as indicated at 47. The remainder of the pistons have connecting rods 48 pivotally secured thereto in the usual manner as indicated at 49 and the opposite ends of the connecting rods 48 are pivotally secured to the spider 36 in the usual manner as indicated at 50.

At the juncture of the bores 15 and 17 and thereabove the cylinder 13 has an air chamber 51 surrounding the bore 17. The chamber 51 communicates with the bore 17 through an aperture 52 in the cylinder wall. The aperture 52 extends approximately half way around the bore to match the pocket 45 in the piston (see Fig. 5). The chamber 51 includes an outlet port 52'. Internal of the chamber 51 the cylinder has an air chamber 53 which communicates with the interior of the bore 15 through a cut away portion 54 of the cylinder wall. Between the chambers 51 and 53 I provide a piston ring 55 in the face of the bore 17.

Outward from the air chamber 51 the piston on one side thereof includes an exhaust chamber 56 which communicates with the bore 17 and has an outlet port 57 (see Fig. 3). Opposite the outlet port 57 the cylinder includes a funnel shaped fresh air conduit 58 which communicates with the bore 17 on the same plane as the exhaust chamber 56. The exhaust port 57 is positioned on the rear side of the cylinder and the conduit 58 is positioned on the front side of the cylinder.

Outward from the exhaust chamber 56 the cylinder includes an air chamber 59 which communicates with the bore 17 through a plurality of apertures 60 which are positioned tangential to the bore 17 (see Fig. 4). The chamber 59 has an inlet port 61 which opens through the rear wall of the cylinder.

At its outer end the cylinder bore 17 terminates in a wall 62 the inner face of which is arched outward as indicated at 63. Extending outward from the wall 62 the cylinder includes a reduced boss 64 which has a threaded recess 65 therein. The wall 62 has a plurality of small apertures 66 therein which communicate with the recess 65 and open into the bore 17 (see Fig. 11).

For directing fuel into the bore 17, I provide a fuel injector 67 which is shown in detail in Fig. 11. As shown the injector 67 includes a body portion 68 having an enlarged wrench engaging portion 69 thereon and a reduced threaded hub 70 which is positioned in the threaded recess 65 of the cylinder. At the end of the injector opposite the threaded hub 70 the body 68 has an angularly extending threaded coupling boss 71 thereon.

The threaded hub 70 has an axial recess 72 therein which communicates with a reduced threaded recess 73 which in turn communicates with a reduced recess 74 which terminates in a ball valve seat 75. The body 68 has an aperture 76 therein which at one end communicates with the recess 74 and at the opposite end opens out through the end of the coupling boss 71.

Positioned in the recess 72, I provide a plug member 77 which includes an enlarged threaded portion 78 which is positioned in the threaded recess 73. The outer diameter of the plug 77 is slightly less than the diameter of the recess 72 so that when the plug is positioned in the recess 72 a small annular space is left between the plug and the walls of the recess 72. Adjacent the threaded portion 78 the plug 77 has an annular recess 79 in the outer face thereof. The threaded portion 78 has a recess 80 therein which opens through the end thereof into the recess 74. The plug 77 has a plurality of radially extending apertures 81 therein which communicate with the recess 80 and the annular recess 79. Positioned in the recess 74, I provide a ball valve 82 and between the end of the threaded portion 78 of the plug 77 and the ball valve I provide a coiled spring 83 which urges the ball 82 into engagement with the valve seat 75 to prevent passage from the recess 74 into the aperture 76.

For forcing fuel to the injectors 67, I provide for each injector an injector pump 84 one of which is shown in detail in Fig. 12. As shown the pump 84 includes a hollow body portion 85 having a coaxial reduced stem portion 86 extending from one end and which has a bore 87 therein communicating with the interior of the body. At the opposite end the body 85 includes an enlarged flange portion 88 on which a head portion 89 is suitably mounted.

The head 89 includes a reduced stem 90 which extends into the body 85 and opposite the stem the head includes a threaded coupling boss 91. Intermediate the stem 86 and the threaded boss 91 the head includes an angularly extending coupling arm 92. The head 89 has a bore 93 therein which at one end opens through the end of the stem 90 and at the opposite end opens through the end of the coupling portion 91 and further includes an aperture 94 which at one end communicates with the bore 93 and at the opposite end opens out through the end of the arm 92.

Positioned in the body 85 and extending into the bore 93 of the head I provide a plunger rod 95 which at the end in the body includes an enlarged head 96 having a washer 97 setting thereon. Surrounding the stem 90 and the plunger rod 95 between the head 89 and the washer 97, I provide a coiled spring 98 which resiliently urges the plunger rod away from the head 89. Positioned in the bore 87, I provide a tappet rod 99 which at its inner end has a tappet bolt 100 threadedly secured thereto which is adapted to be clasped in an adjusted position by a lock nut 101. In operation the tappet bolt 100 engages the head 96 of the plunger rod 95.

At the rear of the cylinders the crank case 12 has a plurality of radially extending recesses 102 and coaxial apertures 103 therein. The recess 102 opens to the outside of the crank case while the apertures 103 open to the inside of the crank case. The injector pumps 84 are positioned with the body portions thereon in the crank case recesses 102 and the stem portions 86 in the apertures 103. Each of the injector pumps 84 is connected to its associated injector devices 67 by a length of tubing 104. One end of each of the tubes 104 is connected to the coupling boss 71 of the injector by a standard tubing coupling nut 105 and the opposite end of the tube is connected to the coupling nut 106. For conveying fuel to the injector pump 84, I provide an endless manifold 107 which is connected to the coupling arm 92 of each pump by a coupling member 108.

Mounted on the shaft 33 forward of the bearing 32, I provide an injector pump operating member 109 which is shown in detail in Figs. 6, 7 and 8. The member 109 is mounted to slide on the shaft 33 and is secured to the shaft to rotate therewith by a spline 110. As shown the member 109 includes a cylindrical body portion 112 having an enlarged annular flange 113, at one end, which has an annular groove 114 in the peripheral face thereof. Extending from the flange 113 to a point spaced from the opposite end of the member the body 112 has a raised cam portion 115 thereon. The cam 115 tapers upwardly from its forward end where it is flush with the body towards the flange 113. At its forward end the cam 115 is approximately twenty degrees wide on an arc from its longitudinal center and the leading edge 116 of the cam tapers rearwardly until adjacent the flange 113 it is approximately forty-five degrees wide.

Adjacent the operating member 109 the crank case has an aperture 117 (Fig. 6) therein which is closed by a plate 118 having a slot 119 therein. Positioned in the slot 119, I provide an operating lever 120 which is pivotally mounted intermediate its length on the plate 118 as at 121. The lever 120 extends into the crank case where it includes a forked portion 122 which fits over the flange 113 of the operating member 109 and has opposed pins 123 thereon which are positioned in the groove 114 of the member 109. Thus by swinging the lever 120 about its pivot 121 the operating member 109 can be moved longitudinally on the shaft 33.

When the shaft 33 rotates the operating member 109 rotates with it and when the member 109 is moved forwardly to a position wherein the tappet rods 99 are in the path of rotation of the cam member the cam member will move the tappet rods 99 outward as it passes thereby. As a tappet rod 99 moves outwardly it moves its associated plunger rod 95 with it against the action of the spring 98. When the plunger rod 95 moves outwardly it closes the entrance of the aperture 94 into the bore 93 and as it continues to raise it forces the fuel in the tubing 104 past the ball valve 82 of the injector 67 into the plug recess 83 thence out through the apertures 81 into the space between the plug 77 and the walls of the recess 72 and then into the recess 75 from whence it is discharged into the bore 17 through the apertures 66.

For supplying fuel to the manifold 107, I provide a gear pump device which is indicated at 125. The gear pump 125 is of the standard type comprising a pair of intermeshing gears 126 and 127 mounted to rotate in a housing 128. The gear 126 is shown as mounted on a stub shaft 129 and the gear 127 is mounted on and secured to a drive shaft 130 which is journalled in a pair of spaced bearings 131 and 132 in the crank case. Mounted on and secured to the shaft 130 between the bearings 131 and 132, I provide a worm gear 133 which meshes with a worm or mitre gear 134 mounted on and secured to the shaft 33. The inlet 135 of the pump 125 communicates with a source of fuel supply (not shown) through a tubing 136 and the pump outlet 137 communicates with the interior of the manifold 107 through a tubing 138.

The springs 83 of the injectors 67 are of sufficient strength to retain the ball valves 82 in engagement with their associated valve seats 75 against the action of the pump 125.

Below the shaft 33, I provide a pair of gear pumps 139 and 140 (Fig. 13). The pump 139 includes a pair of intermeshing gears 141 and 142 and the pump 140 includes a pair of intermeshing gears 143 and 144. The gears 141 and 143 are mounted on a stub shaft 145 while the gears 142 and 144 are mounted on and secured to the shaft 130. The inlet 146 of the pump 140 communicates with a source of fresh oil supply (not shown) through a tubing 147 and from the outlet 148 a tubing 149 directs oil under pressure to various portions of the engine.

The outlet 150 of the pump 139 communicates with a used oil reservoir (not shown) through a tubing 151. In the side wall of the lowermost bore 20 of the crank case I provide an annular recess 152 which communicates with a chamber 153 in the crank case through a conduit 154 in the crank case (see Fig. 1). The inlet 155 of the pump 139 opens into the chamber 153 as shown in Fig. 13.

Oil runs down the side walls of the bore 20 and collects in the groove 152 from which it flows through the conduit 154 into the chamber 153 and thence into the inlet 155 of the pump 139.

The outlet port 52' of each of the cylinder air chambers 51 communicates through a conduit 156 with the inlet port 61 of the chamber 59 of the second next cylinder as clearly shown in Fig. 2.

To collect the exhaust gases from the cylinders I provide an endless hollow exhaust manifold 157 which is divided into two chambers 158 and 159 by a partition 160 (see Figs. 1 and 3). The partition 160 has a plurality of apertures 161 therein which are formed when finger portions 162 are outstruck therefrom.

Each of the exhaust ports 57 of the cylinders communicates with the exhaust manifold chamber 158 through a conduit 163. Each of the conduits 163 enters the chamber 158 and is bent at an angle as indicated at 164 and continues a predetermined distance towards the next cylinder. The fingers 162 extend into the chamber 159 and are inclined in the same direction as the portions 164 of the conduits 163.

To convey the exhaust gases out of the exhaust manifold 157, I provide a conduit 165 which communicates with the chamber 159 at the lower side of the manifold.

When exhaust gases leave the conduits 163 the gases from each of the conduits 163 are all directed in the same direction and travel around in the chamber 158 thereby creating a partial vacuum in each of the conduits 163. From the chamber 158 the exhaust gases pass through the apertures 161 in the partition 160 into the chamber 159 and thence out of the chamber 159 into the conduit 165.

When the engine is operating and one of the pistons 40 is at the bottom of its stroke as shown at the bottom of Fig. 1 the top of the piston is inward from the exhaust chamber 56 and the fresh air inlet conduit 58. As the piston moves outward it passes the exhaust chamber 56 and the conduit closing passageway into the cylinder bore 17 from the conduit 58 and the chamber 56. Furthermore as the piston moves outwardly air in the cylinder bore 15 is forced out of the bore 15 into the chamber 53 and the chamber 52 whence it passes out through the outlet 52' into its associated conduit 156 through which it passes to the inlet port 61 of the chamber 59 of the second next cylinder.

During the outward travel of the piston 40 air from the conduit 156 enters the air chamber 59 and flows therefrom through the apertures 60 into the bore 17. As the air in the chamber 59 is under pressure and the apertures are arranged tangential to the bore 17 the air enters the bore 17 and travels around therein and upward where the curvature 63 of top wall 67 deflects it thereby causing a turbulent action.

As the piston 40 approaches the limits of its outward travel its associated injector pump 84 is actuated to force fuel through the injector 67 into the bore 17 as previously described. When the fuel in the bore 17 ignites it expands and forces the piston 40 inward and as the piston moves past the exhaust chamber 56 the burned gases in the bore 17 are forced therefrom into the exhaust chamber 56 by slip stream air coming into the bore 17 through the conduit 58.

From the foregoing it will be apparent that I have invented a novel rotary prime mover which can be economically manufactured and which is highly efficient in use and further that my prime mover is so constructed that it can be very readily maintained in operation and repaired.

Having thus described my invention, I claim:

1. An engine including a plurality of radial cylinders, each of said cylinders having an inner enlarged bore and a reduced outer bore opening into said first bore, each of said cylinders including an air chamber, each of said air chambers communicating with its associated enlarged bore, said air chambers each having an outlet, each of said cylinders including a second air chamber communicating with its associated reduced bore, said second air chambers each having an inlet and means to place the outlets of said first air chambers in communication with the inlets of said second air chambers of cylinders other than the associated cylinder.

2. An engine including a plurality of radial cylinders, each of said cylinders having an inner bore and a coaxial reduced bore opening into said first bore, the outer end of said reduced bore being closed, each of said cylinders including an exhaust chamber communicating with its associated reduced bore, an outlet from said exhaust chamber, each of said cylinders including an air chamber positioned inward from said exhaust chamber, said air chambers communicating with its associated enlarged bore, said air chambers each having an outlet, each of said cylinders including a second air chamber positioned outward from said exhaust chamber and communicating with its associated reduced bore, said second air chambers each having an inlet and means to place the outlets of said first air chambers in communication with the inlets of second air chambers of cylinders other than the associated cylinder.

3. An engine including a crank case having a plurality of cylinders thereon, each of said cylinders having an inner bore and a coaxial reduced outer bore opening into said first bore, a piston in each of said cylinders, each of said pistons including a body portion positioned in said outer bore and an enlarged flange portion positioned in said inner bore, each of said cylinders including an air chamber adjacent the juncture of said two bores, each of said chambers communicating directly with the inner bore of the cylinder with which it is associated, an outlet from said chamber, said enlarged flange of said piston when said piston is travelling outward forcing air from said inner bore into said chamber.

4. An engine including a crank case having a plurality of cylinders thereon, each of said cylinders having an inner bore and an outer bore opening into said first bore, a piston in each of said cylinders, each of said pistons including a portion positioned in said outer bore and an inner portion positioned in said inner bore, each of said cylinders including an exhaust chamber communicating with its associated outer bore, an outlet from each of said exhaust chambers, each of said cylinders including an air chamber positioned inward from said exhaust chamber, each of said air chambers communicating with its associated inner bore, said air chambers each having an outlet, each of said cylinders including a second air chamber positioned outward from said exhaust chamber and communicating with its associated outer bore, each of said second air chambers having an inlet, the outlets of said first air chambers being in communication with the inlets of said second air chambers of cylinders other than its associated cylinder, said inner portions of said pistons when said pistons are travelling outward forcing air from their inner bores into their associated first air chambers thereby forcing air from their associated first air chambers into the second air chambers of other cylinders.

5. An engine including a crank case having a plurality of cylinders thereon, each of said cylinders having an inner bore and a coaxial reduced outer bore opening into said first bore, the outer end of said second bore being closed, a piston in each of said cylinders, each of said pistons including a body portion positioned in said outer bore and an enlarged flange portion positioned in said inner bore, each of said cylinders including an exhaust chamber communicating with its associated reduced bore, an outlet from each of said exhaust chambers, each of said cylinders including an air chamber positioned inward from said exhaust chamber, each of said air chambers communicating with its associated enlarged bore, said air chambers each having an outlet, each of said cylinders including a second air chamber positioned outward from said exhaust chamber and communicating with its associated reduced bore, each of said second air chambers having an inlet, the outlets of said first air chambers being in communication with the inlets of said second air chambers of cylinders other than its associated cylinder, said enlarged flange portions of said pistons when said pistons are travelling outward forcing air from their inner bores into their associated first air chambers and thereby forcing air from their associated first air chambers into the second air chambers of other cylinders.

6. An engine including a crank case having a plurality of cylinders thereon, each of said cylinders having an inner bore and an outer bore opening into said inner bore, each of said cylinders including an air chamber having an inlet communicating with one of the bores thereof, each of said air chambers having an outlet, means to place the outlet of each of said air chambers in communication with the other of said bores of the second succeeding cylinder taken in the order of firing.

7. An engine including a crank case having a plurality of cylinders thereon, each of said cylinders having an inner bore and an outer bore opening into said inner bore, each of said cylinders including a circumferentially extending air chamber, said air chambers each communicating with its associated enlarged bore, said air chambers each having an outlet, each of said cylinders including a second circumferentially extending air chamber communicating with its associated reduced bore, said second air chambers each having an inlet and means to place the outlets of said first air chambers in communication with the inlets of said second air chambers of cylinders other than the cylinders.

8. In an engine adapted to be positioned in an air stream, a crank case, a plurality of cylinders on said crank case, said cylinders each having a pair of aligned apertures therein, means to simultaneously open said apertures, means to direct a portion of the air stream through said apertures, means to close said apertures, each of said cylinders having a third aperture therein spaced outward from said aligned apertures, means to open said third aperture, pump means operated by said engine, means to conduct fluid from said pump through said third aperture into said cylinder, and means to close said third aperture.

9. In an engine adapted to be positioned in an air stream, a crank case, a plurality of cylinders on said crank case, said cylinders each having a pair of aligned apertures therein, means to simultaneously open said apertures, means to direct a portion of the air stream through said apertures, means to close said apertures, each of said cylinders having a third aperture therein spaced outward from said aligned apertures, means to open said third aperture, pump means operated by said engine, means to conduct air from said pump through said third aperture into said cylinder, means to close said third aperture, a fuel injector outward from said third aperture, and means to actuate said fuel injector after said third aperture is closed.

10. In an engine adapted to be positioned in an air stream, a crank case, a plurality of cylinders on said crank case, said cylinders each having a pair of apertures therein, means to simultaneously open said apertures, means to direct a portion of the air stream through one of said apertures into each cylinder, means to remove said portion of air through the other of said apertures, means to close said apertures, each of said cylinders having a third aperture therein spaced outward from said aligned apertures, means to open said third apertures, means to conduct fluid through said third apertures into said cylinders, and means to close said third apertures.

NEWELL O. ALLYN.